United States Patent
Song et al.

(10) Patent No.: US 11,500,517 B2
(45) Date of Patent: Nov. 15, 2022

(54) EMBEDDING PRODUCTIVITY APPLICATIONS IN THIRD PARTY PLATFORMS

(71) Applicant: GOOGLE LLC, Mountain View, CA (US)

(72) Inventors: Juyun Song, Brooklyn, NY (US); Daniel Gundrum, New York, NY (US); Robert Dunnette, New York, NY (US); Ian Roth, Brooklyn, NY (US); Bradley Patrie, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/041,941

(22) PCT Filed: Jul. 16, 2018

(86) PCT No.: PCT/US2018/042343
§ 371 (c)(1),
(2) Date: Sep. 25, 2020

(87) PCT Pub. No.: WO2020/018070
PCT Pub. Date: Jan. 23, 2020

(65) Prior Publication Data
US 2021/0124468 A1 Apr. 29, 2021

(51) Int. Cl.
*G06F 3/0482* (2013.01)
*G06F 40/166* (2020.01)
(Continued)

(52) U.S. Cl.
CPC ........ *G06F 3/0482* (2013.01); *G06F 3/04845* (2013.01); *G06F 40/166* (2020.01);
(Continued)

(58) Field of Classification Search
CPC ................ G06F 3/0482; G06F 40/166; G06F 3/04845; G06F 9/451; G06F 9/4451;
(Continued)

(56) References Cited

U.S. PATENT DOCUMENTS 10,261,938 B1 * 4/2019 Jenkins ............... G06F 16/9574
2005/0273762 A1 * 12/2005 Lesh ..................... G06F 3/0482
717/115

(Continued)

FOREIGN PATENT DOCUMENTS

WO 2013/036920 3/2013

OTHER PUBLICATIONS

International Search Report and Written Opinion dated Apr. 9, 2019, on application No. PCT/US2018/042343.

*Primary Examiner* — Tuyetlien T Tran
(74) *Attorney, Agent, or Firm* — Lowenstein Sandler LLP

(57) ABSTRACT

A method receives a request of a first user of the third party platform to customize a GUI of a first electronic document editing application. The method provides the requested GUI. The method receives input of the first user for one or more GUI components associated with features of the first electronic document editing application. The method customizes the GUI of the first electronic document editing application based on the received input of the first user. The method stores the customized GUI. The method receives an indication of a request of a second user of the third party platform to manipulate an electronic document of the first electronic document type. The method provides the customized GUI of the first electronic document editing application.

23 Claims, 8 Drawing Sheets

(51) Int. Cl.
  *G06F 3/04845* (2022.01)
  *H04L 67/02* (2022.01)
  *G06Q 10/10* (2012.01)
  *G06F 9/445* (2018.01)
  *G06F 9/455* (2018.01)
  *G06F 9/451* (2018.01)
(52) U.S. Cl.
  CPC ............ *H04L 67/02* (2013.01); *G06F 9/4451* (2013.01); *G06F 9/451* (2018.02); *G06F 9/45529* (2013.01); *G06Q 10/10* (2013.01); *G06Q 10/101* (2013.01)
(58) Field of Classification Search
  CPC ............. G06F 9/45529; G06F 9/44505; H04L 67/02; G06Q 10/10; G06Q 10/101
  See application file for complete search history.

(56) References Cited

U.S. PATENT DOCUMENTS

| | | | |
|---|---|---|---|
| 2011/0154216 A1 | 6/2011 | Aritsuka et al. | |
| 2013/0297680 A1* | 11/2013 | Smith | H04L 29/08117 709/203 |
| 2014/0258972 A1* | 9/2014 | Savage | G06F 8/30 717/106 |
| 2014/0330896 A1* | 11/2014 | Addala | H04L 67/1095 709/203 |
| 2015/0195179 A1* | 7/2015 | Skare | G06F 3/0482 715/745 |
| 2017/0010869 A1* | 1/2017 | Heiney | G06F 40/186 |
| 2017/0111465 A1* | 4/2017 | Yellin | H04L 67/1076 |

\* cited by examiner

EMBEDDING PRODUCTIVITY APPLICATIONS IN THIRD PARTY PLATFORMS

TECHNICAL FIELD

Aspects and implementations of the present disclosure relate to electronic documents, and more specifically, to embedding access to electronic document editing applications into third party platforms.

BACKGROUND

Electronic document editing applications can be used to manipulate (e.g., create, edit, view, print, etc.) electronic documents. Electronic document editing applications include applications of different classes such as a word processing application, a spreadsheet application, and a presentation application. Electronic document editing applications of the same class can be provided by multiple platforms and be associated with electronic documents of different types.

SUMMARY

An aspect of the disclosure provides a method to customize graphical user interfaces (GUIs) of a plurality of electronic document editing applications provided by a cloud storage system for users of a third party platform, the method comprising: receiving, by the cloud storage system, a request of a first user of the third party platform to customize a GUI of a first electronic document editing application of the plurality of electronic document editing applications provided by the cloud storage system, each of the plurality of electronic document editing applications configured to manipulate electronic documents of a particular one of a plurality of different electronic document types; providing, by the cloud storage system, the requested GUI of the first electronic document editing application associated with a first electronic document type; receiving input of the first user for one or more of a plurality of GUI components associated with features of the first electronic document editing application; customizing the GUI of the first electronic document editing application based on the received input of the first user; storing, at the cloud storage system, the customized GUI of the first electronic document editing application in association with the third party platform, the customized GUI to be embedded into a GUI of the third party platform; receiving, via the GUI of the third party platform, an indication of a request of a second user of the third party platform to manipulate an electronic document of the first electronic document type; and upon receiving the indication of the request of the second user to manipulate the electronic document of the first electronic document type, providing, by the cloud storage system, the customized GUI of the first electronic document editing application, wherein the customized GUI uses an API associated with the first electronic document editing application to allow the second user to manipulate the electronic document of the first electronic document type.

The method may optionally include one or more of the following features. The customized GUI may be embedded into the GUI of the third party platform via an inline frame, iframe, added to the GUI of the third party platform. The method may further comprise: creating, based on the customized GUI, a script to generate a preloaded version of the customized GUI to preload for presentation to the second user to allow the second user to manipulate the electronic document without a delay resulting from obtaining the customized GUI from the cloud storage system; and transmitting the script to the third party platform. The request of the second user to manipulate the electronic document of the first electronic document type may be a request to create a new electronic document of the first electronic document type. The script may be to generate, in response to the request to create the new electronic document, the preloaded version of the customized GUI in local memory associated with a browser that presents the third party GUI, the preloaded version of the customized GUI is to display a blank electronic document when the preloaded version of the customized GUI is rendered as part of the third party GUI. In response to user interaction with the preloaded version of the customized GUI, the script may be to cause the customized GUI to be obtained from the cloud storage system to replace the preloaded version of the customized GUI presented as part of the third party GUI. The script may be to determine that the user interaction with the blank electronic document adds content to the blank electronic document, and to cause a copy of the content to be sent to the cloud storage system to include in the customized GUI when the customized GUI replaces the presented preloaded version. Other features associated with other of the plurality of GUI components that were not selected by the first user to include in the customized GUI of the respective electronic document editing application may not be made available to the second user of the third party platform. The request of the second user to manipulate the electronic document of the first electronic document type may be a request to edit an electronic document stored at the cloud storage system. Providing the customized GUI of the first electronic document editing application may comprise retrieving the electronic document from the cloud storage system, and providing the retrieved electronic document for presentation to the second user in the customized GUI of the first electronic document editing application. The request of the second user to manipulate the electronic document of the first electronic document type may be a request to edit an electronic document stored at the third party platform; and providing the customized GUI of the first electronic document editing application may comprise: creating, at the cloud storage system, a blank electronic document of the first electronic document type; sending, to the third party platform, a request for content of the electronic document stored at the third party platform; receiving the requested content of the electronic document; modifying the blank electronic document by pasting the requested content into the blank electronic document of the first electronic document type; and providing the modified electronic document for presentation to the second user in the customized GUI of the first electronic document editing application. The method may further comprising: sending, to the third party platform, changes to the content of the modified electronic document for pasting into the electronic document stored at the third party platform, the changes provided by the second user. The method may further comprise: receiving a request of the third party platform to delete the modified electronic document stored at the cloud storage system; and responsive to the request of the third party platform to delete the modified electronic document, deleting the modified electronic document stored at the cloud storage system.

A further aspect of the disclosure provides a system comprising: a memory; and a processing device, coupled to the memory, the processing device to perform a method according to any aspect or implementation described herein.

A further aspect of the disclosure provides a computer-readable medium comprising instruction that, responsive to execution by a processing device, cause the processing device to perform operations comprising a method according to any aspect or implementation described herein

BRIEF DESCRIPTION OF THE DRAWINGS

Aspects and implementations of the present disclosure will be understood more fully from the detailed description given below and from the accompanying drawings of various aspects of the disclosure, which, however, should not be taken to limit the disclosure to the specific aspects or implementations, but are for explanation and understanding only.

DETAILED DESCRIPTION

Figure 1:
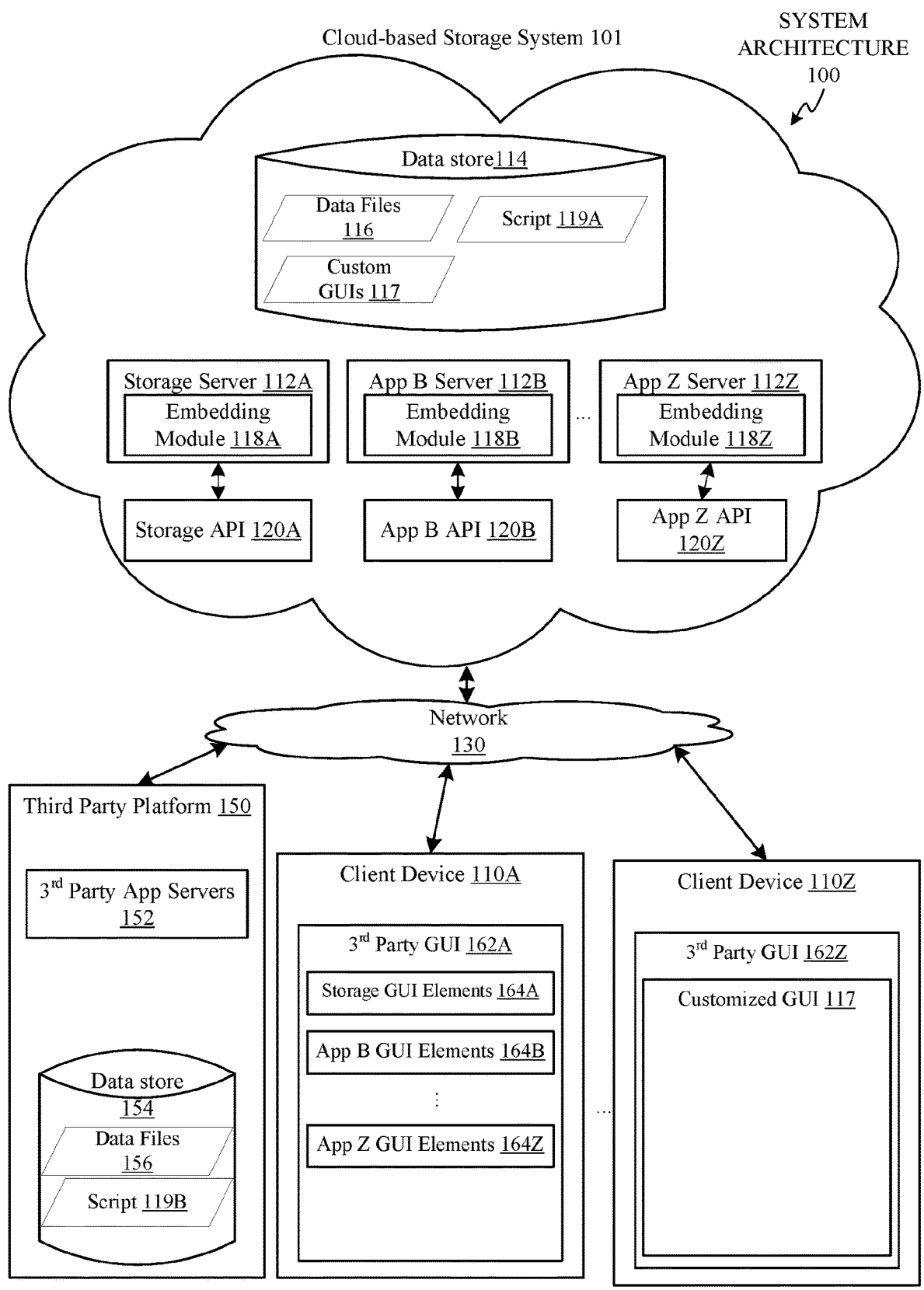
FIG. 1 illustrates an example of a system architecture, in accordance with implementations of the disclosure.

An electronic document may refer to media content used in electronic form. Media content may include text, tables, videos, audio, images, graphs, slides, charts, software programming code, designs, lists, plans, blueprints, maps, etc. Electronic document processing applications (e.g., a word processing application, a spreadsheet application, a presentation application, etc.) can be used to manipulate (e.g., create, edit, view, print, etc.) electronic documents. An electronic document editing application may be a local application hosted by a user device to manipulate local electronic documents stored on the user device. Alternatively, an electronic document editing application can be provided to the user device remotely, for example it may be provided by a cloud-based storage system, which may enable a user to store data files on one or more servers in the cloud-based storage system, share the data files with one or more other users, and synchronize the data files across various user devices. In some instances, the cloud-based storage system may provide a single location to manage the data files for the user. The cloud-based storage system may enable an author of an electronic document to invite other users to join as collaborators with respect to the electronic document stored at the cloud-based storage system. An electronic document to which users have been granted permission to access or edit concurrently may be referred to as a collaborative document herein.

Some electronic document processing applications may include stand-alone applications downloaded to user devices and that natively run on the user devices. Other electronic document processing applications may include web-based electronic document processing applications that may be accessed using browsers installed at the user devices. Third party users of a third party platform may desire to use the electronic document processing applications that are provided by a first party service provider or a first party platform, such as a cloud-based storage system. To access the electronic document processing applications, third party users may exit a third party application of the third party platform to access the electronic document processing applications hosted by a first party platform. For example, a third party user that is working with a web-based third party application may desire to access a first party web-based electronic document processing application of a first party platform. The third party user may minimize a browser window providing access to the third party application and open a new browser window to access the first party electronic document processing application. Electronic documents that are created by the first party electronic document processing application may be transmitted, via an e-mail attachment, to the third party platform to the third party user for upload to the third party platform. Accessing, using, and transmitting data from first party applications by third party users of third party platforms is inefficient and contributes to inefficient use of network bandwidth and computer processing resources.

Alternatively, electronic document processing applications of a first party platform may be integrated into a third party platform (i.e., may be accessible directly via the third party platform). Some of the electronic document processing applications that are integrated into third party platform may not include features desired by users of the third party platform and/or may include features that are not desired by the users of the third party platform. However, conventional integration techniques typically lack the capability for customization. As such, third party platforms that integrate the aforementioned electronic document processing applications may integrate features of the electronic document processing applications that are undesirable, and potentially harmful to the third party platform, which may negatively impact the operation of the third party platform and create difficulties for third party platforms users who access first party electronic document processing applications from the third party platform. As such, integrating electronic document processing applications that lack the capability for customization, include undesirable features, or lack desired features cause inefficient use of computer processing resources, memory resources, storage resources, and network bandwidth.

Further, electronic document processing applications integrated into a third party platform typically suffer from increased latency and other inefficiencies, as compared to the native electronic document processing applications of the third party platform. For example, users using a web-based electronic document processing application that is integrated into a third party platform may experience increased latency in obtaining new electronic documents from the integrated electronic document processing application. In another example, a first party electronic document processing application may not have the ability to integrate with third party data storage.

Aspects and implementations of the disclosure address at least the above challenges by providing, by a first party cloud-based storage system, a customizable first party graphical user interface (GUI) to a third party platform. The cloud-based storage system may host one or more electronic document editing applications. The first party GUI is associated with at least one of the electronic document editing applications hosted by the cloud-based storage system (first party platform). A first user, such as an administrator of the third party platform, may select one or more GUI components to include into the first party GUI to create a customized GUI. The GUI components may be associated with features (e.g., sharing, collaboration, etc.) of an electronic document editing application. The GUI components that are included in the customized GUI give end users of the third party platform access to the associated features via the customized GUI. The features of GUI components that are not included in the customized GUI are not accessible to the end users of the third party platform. The customized GUI may be stored at the cloud-based storage system.

In some implementations, the third party platform may embed the customized GUI into a GUI provided by the third party platform (e.g., a third party platform's GUI provided via a web browser or an application hosted by the third party platform). The cloud-based storage system may receive a request via the third party GUI indicative of a request of an end user of the third party platform to manipulate (e.g., edit or create) an electronic document. The cloud-based storage system may provide the customized GUI of the first party electronic document editing application to the third party platform. The customized GUI may be provided for display within the third party GUI and may use an API associated with the first party electronic document editing application that allows the end user to manipulate the electronic document displayed in the customized GUI in the third party GUI.

For example, the third party application may be a web-based application (e.g., software-as-a-service (SAAS) application) hosted by a third party server of a third party platform. An end user of the third party platform may access the third party application using a third party GUI, such as a third party webpage rendered in a web browser on a user device of the end user. The customized GUI may be embedded into the third party webpage. For instance, the third party platform may use an inline frame (iframe) in the third party webpage to embed the customized GUI. The customized GUI may use an API associated with a particular electronic document editing application to provide the features of the customized GUI to the end user of the third party platform. The customized GUI may be customized in appearance for seamless integration into the third party GUI. For instance, the customized GUI may have the same look and feel (e.g., colors, textures, font, etc.) as the third party GUI and appear as part of the third party GUI. The customized GUI may be customized with features selected for the third party platform. For instance, a selected feature may include a sharing feature that may allow an end user of the third party platform to share the electronic document with other end users of the third party platform. In another instance, a non-selected feature, such as a comment feature that allows users to provide comments in an electronic document, may not be made available to end users of the third party platform.

In some implementations, a script can be generated by the first party cloud-based storage system based on the customized GUI and provided to user devices of end users of the third party platform. The script may be used at the user device of an end user to generate a preloaded version of the customized GUI for presentation to the end user. The script may cause the customized GUI to present a blank electronic document to allow the end user to start entering content for a new electronic document, without a delay resulting from obtaining the customized GUI from the cloud-based storage system. The script may also allow the cloud-based storage system to reduce the computer processing resources, memory resources, storage resources, and network bandwidth used to create a new electronic document that may not be needed by an end user.

For example, some end users of the third party platform may request to create a new electronic document but may not enter any content once a new electronic document is provided by cloud-based storage system. The cloud-based storage system may waste significant computer processing resources, storage resources, memory resources, and network bandwidth to create new electronic documents and send the new electronic documents in the customized GUI to end users of the third party platform who subsequently decide not to use the new electronic documents. The script may allow a preloaded version of the customized GUI that includes a blank electronic document to be generated in local memory at the user device and displayed in the third party GUI. Once a user interacts with the preloaded version of the customized GUI, the cloud-based storage system receives an indication of the user interaction with the preloaded version of the customized GUI. The cloud-based storage system then creates a new electronic document and sends the customized GUI with the new electronic document to the user device. The customized GUI with the new electronic document replaces the preloaded version of the customized GUI on the user device.

In another example, an end user may select a designated GUI element of a third party platform's GUI, such as "create new document" GUI element in the third party webpage rendered by a browser of a user device, to request to create a new electronic document. In response to the user selection of the designated GUI element in the third party GUI, the script may be executed in local memory of the user device to generate a preloaded version of the customized GUI. The preloaded version of the customized GUI includes a blank electronic document. The preloaded version of the customized GUI may be overlaid on or displayed in the iframe of the third party webpage, where the iframe is used to embed the customized GUI of the electronic document editing application hosted by the cloud-based storage system. Responsive to an end user interaction with the preloaded version of the customized GUI (e.g., an end user moving a cursor to the preloaded version of the customized GUI), the script may cause the iframe in the third party webpage to send an API request to the respective electronic document editing application of the cloud-based storage system to obtain the customized GUI associated with the third party platform. The cloud-based storage system may transmit the customized GUI with a blank electronic document to the user device. The preloaded version of the customized GUI at the user device may be replaced by the customized GUI received from the cloud-based storage system.

In another implementation, an end user of the third party platform may request to edit an electronic document with an electronic document editing application hosted by the cloud-based storage system where the electronic document is stored at the third party platform. The cloud-based storage system may create a blank electronic document and send a request to the third party platform to request content of the electronic document stored at the third party platform. The cloud-based storage system may receive a copy of the content of the electronic document stored at the third party platform and modify the blank electronic document by pasting the content into the blank electronic document. The customized GUI including the modified electronic document is provided to the user device of the end user for display in the third party GUI.

In some implementations, once the second user is finished editing the modified electronic document, a copy of the contents of the modified electronic document is sent to the third party platform. The content of the modified electronic document is pasted into the electronic document stored at the third party platform. In implementations, the third party platform sends to the cloud-based storage system a delete request to delete the modified electronic document stored at the cloud-based storage system.

As noted above, a technical problem addressed by implementations of the disclosure is the inefficient use of network bandwidth and computer processing resources by electronic document processing applications that can be integrated into third party platform but do not allow for robust customization for the third party platform. For example, an electronic document processing application may be integrated into a third party platform. The electronic document processing application may allow for sharing among users. The requirements of the third party platform may dictate that the document sharing among users be not allowed (e.g., for security purposes). As a result, additional software may need to be developed to prevent sharing. The additional software may also need to be deployed to all user devices and executed by the user devices when end users are accessing the integrated electronic document processing applications, which is an inefficient use of network bandwidth and computer processing resources.

As also noted above, another technical problem addressed by implementations of the disclosure is latency experienced by end users of the third party platform accessing first party electronic document processing applications via a third party platform to create new electronic documents. For example, a user requesting to create a new electronic document via an integrated first party electronic document processing application may have to wait an appreciable amount of time to receive from the first party electronic document processing application a GUI with a blank electronic document at the third party application of the third party platform.

As also noted above, another technical problem addressed by implementations of the disclosure is the inefficient use of computer processing resources, memory resources, storage resources, and network bandwidth in the creation and transmission of blank electronic documents to user devices where the users of the user devices ultimately decide not to use the blank electronic documents.

Also noted above, another technical problem addressed by implementations of the disclosure is the lack of ability of a third party platform to provide its end users with an option select whether to use a first party electronic document editing application with electronic documents that are stored at the third party platform or the cloud-based storage system.

A technical solution to the above identified technical problems may allow the third party platform to create a customized GUI for an electronic document editing application hosted by a first party cloud-based storage system. The customized GUI can be embedded into the third party GUI. The user can access the customized GUI via the third party GUI to manipulate the electronic document. A script may be created based on the customized GUI. The script can be used to generate a preloaded version of the customized GUI in local memory of the client device. Additionally, the electronic document editing application hosted by the cloud-based storage system and accessible by a customized GUI embedded in the third party GUI may be used to edit either electronic documents stored at the cloud-based storage system or electronic documents stored at the third party platform.

Thus, the technical effect may include reduced latency, decreased overall storage and memory usage, and decreased overall bandwidth usage and computer processing usage of cloud-based storage systems and third party platforms.

FIG. 1 is an example of a system architecture 100, in accordance with implementations of the disclosure. The system architecture 100 includes a cloud-based storage system 101 connected to client devices 110A-110Z (generally referred to as "client device(s) 110" herein) via a network 130. Cloud-based storage system 101 (also referred to as "cloud storage system" or "first party cloud-based storage system" herein) includes components, tools, and services that may be controlled by the cloud-based storage system 101 and may referred to as first party components, first party tools, first party services, and so forth.

In implementations, the cloud-based storage system 101 refers to a collection of physical machines, such as 112A-112Z (generally referred to as "server(s) 112" herein), that host applications providing one or more services to multiple client devices 110A-110Z via the network 130. In some implementations, the applications hosted by cloud-based storage system 101 may be one or more electronic document editing applications (e.g., such as a word processing application, a spreadsheet application, a slide presentation application, etc.) that provide services (e.g., word processing, spreadsheet processing, slide generation for inclusion in a slide presentation, etc.) to users accessing the cloud-based storage system 101 via network 130. The electronic document editing applications allow users to manipulate (e.g., access, create, edit, store, delete, share, collaborate, print, etc.) electronic documents.

Examples of electronic document editing applications include, but are not limited to, word processing applications, spreadsheet applications, slide presentation applications, messaging applications, data storage applications, among others. Each of the electronic document editing applications may correspond to an electronic document of a particular electronic document type. For example, a word processing application may allow for editing of an electronic document of a word processing electronic document type. A spreadsheet processing application may allow for editing of an electronic document of a spreadsheet electronic document type, and so forth.

In implementations, cloud-based storage system 101 may enable communication between servers 112A-112Z and with client devices 110A-110Z over the network 130 to store and share data. For purposes of illustrations, each of the servers 112A-112Z are shown to host different electronic document editing applications. For example, storage server 112A may host a storage application that creates or stores data files 116. In another example, application B server 112B may host a word processing application. In still another example, application Z server 112Z may host a slide presentation application.

Although the system architecture 100 is described in the context of a cloud-based storage system 101, which may enable communication between servers 112A-112Z in the cloud-based storage system 101 and with client devices 110A-110Z over the network 130 to store and share data, it can be understood that the implementations described herein may also apply to systems that are locally interconnected.

The network 130 may be a public network (e.g., the Internet), a private network (e.g., a local area network (LAN) or wide area network (WAN)), or a combination thereof. Network 130 may include a wireless infrastructure, which may be provided by one or more wireless communications systems, such as a wireless fidelity (Wi-Fi) hotspot connected with the network 130 or a wireless carrier system that can be implemented using various data processing equipment, communication towers, etc. Additionally or alternatively, network 130 may include a wired infrastructure (e.g., Ethernet).

In implementations, cloud-based storage system 101 may include data store 114. In some implementations, data store 114 may be separate from the servers 112A-112Z and communicatively coupled to the servers 112A-112Z. In some implementations, the data store 114 may be part of one or more of the servers 112A-112Z. In implementations, data store 114 may store data files 116, custom graphical user interfaces (GUI) 117, or script 119A. Contents of the data store 114 may further be described in the subsequent Figures.

In implementations, data store 114 may store a data file 116 that may include content (e.g., text, data tables, images, video, audio, etc.). In one implementation, the data file 116 may be any suitable data file including content that is uploaded to the cloud-based storage system 101 by the client devices 110A-110Z or from a server within or outside of the cloud-based storage system 101. In an implementation, the data file 116 may be an electronic document, such as a collaborative document that can be shared with users or be concurrently editable by users. In implementations, the term "concurrently editable" may refer to users concurrently modifying (e.g., adding, deleting, changing, etc.) content (e.g., text, cells, images, data, slides, etc.), concurrently suggesting changes to the content, concurrently making comments on the content, and the like.

In implementations, changes to the collaborative documents may be provided to or be presented on client devices 110A-110Z in real-time. In implementations, real-time may refer to the transmission, presentation, or display of changes to a collaborative document to one or more client devices 110 as the changes are being made on different client devices. For example, real-time changes (e.g., edits) to a collaborative document may be displayed on a display of a client device 110A substantially concurrent with a user editing the collaborative document using client device 110Z (at least within the technical limitations of displaying real-time changes, e.g., the user edits to the collaborative document may be displayed within milliseconds of user input and may appear to the receiving user as if in absolute real-time).

In implementations, the collaborative document may be a word processing document, a spreadsheet document, a slide presentation document, or any suitable electronic document an electronic document including content such as text, data tables, videos, images, graphs, slides, charts, software programming code, designs, lists, plans, blueprints, maps, etc.) that can be shared with users.

The collaborative document may be created by an author and the author may share the collaborative document with other users (e.g., collaborators). Sharing the collaborative document may refer to granting permission to the other users to access (view and/or edit) the collaborative document. Sharing the collaborative document may include informing the other users of the collaborative document via a message (e.g., email, text message, etc.) including a link to the collaborative document. The level of permissions that each user is granted may be based on the user type of each particular user. For example, a user with an editor user type may be able to open the collaborative document and make changes directly to the collaborative document. As such, numerous collaborators may make changes to the content presented in the collaborative document.

The servers 112A-112Z (or servers 152) may be physical machines (e.g., server machines, desktop computers, etc.) that each include one or more processing devices communicatively coupled to memory devices and input/output (I/O) devices. The processing devices may include a computer, microprocessor, logic device or other device or processor that is configured with hardware, firmware, and software to carry out some of the implementations described herein. Each of the servers 112A-112Z may host a embedding module 118A-118Z (generally referred to as "embedding module(s) 118" herein). The embedding modules 118A-118Z may be implemented as computer instructions that are executable by one or more processing devices on each of the servers 112A-112Z. The embedding modules 118A-118Z may perform the operations described with respect to the following Figures.

In implementations, the third party platform 150 refers to a collection of physical machines, such as server(s) 152 (also as referred to as "third party application server(s) 152" herein), that host applications (e.g., software as a service (SAAS)) providing one or more services to multiple client devices 110A-110Z via the network 130. In implementations, the third party platform may include servers 152, data store 154, and third party applications that provide third party graphical user interface (GUI) 162A-162Z (generally referred to as "third party GUI(s) 162" herein).

Third party platform 150 may include components, tools, and services that may be controlled by the third party platform 150 and may referred to as third party components, third party tools, third party services, and so forth. For example, third party users can access third party services hosted by a third party application server via a third party webpage in a browser of client device 110.

In implementations, data store 154 of third party platform 150 may be similar to data store 114 of cloud-based storage system 101. Data store may contain data files 156, and script 119B. Script 119B may be a copy or instance of script 119A of cloud-based storage system 101. For example, cloud-based storage system 101 may transmit and instance of script 119A to third party platform 150. Third party platform 150 may transmit script 119B to client devices 110 for execution.

Data files 156 may be similar to data files 116 of cloud-based storage system 101. In some implementations, data files 116 and data files 156 may include electronic documents of the same or similar electronic document type. For example, data files 116 and data files 156 both include electronic documents of the spreadsheet electronic document type. In some implementations, data files 116 and data files 156 may include electronic documents of the same or similar electronic document type that also have the same format type. For example, data files 116 and data files 156 both include electronic documents of spreadsheet electronic document type having the XYZ format (e.g., electronic documents having an .XYZ extension). In some implementations, data files 116 and data files 156 may include electronic documents of the same or similar electronic document type that have different format types. For example, data files 116 includes electronic documents of the spreadsheet electronic document type having the XYZ format .XYZ extension), and data files 156 includes electronic documents of the spreadsheet electronic document type having the ABC format (e.g., .ABC extension)

Third parties may desire to integrate the services provided by cloud-based storage system 101 into the third party platform 150. For example, users of the third party platform 150 may be familiar and have preference for electronic document editing applications provided by the cloud-based storage system, and therefore a third party may desire to "embed" the first party services and features into a third party platform (e.g., into a home screen or another GUI provided by a third party application such as a web application of the third party platform or a client application of the third party platform). Embed may refer to displaying (e.g., embedding) or providing, by a third party, content or services that are hosted by a first party (e.g., cloud-based storage system 101). For example, a first party customized GUI 117 may be embedded in the third party GUI 162 and used to access the services provided by cloud-based storage system 101.

In implementations, third party platform 150 may enable communication between servers 152 and with client devices 110A-110Z over the network 130 to store and share data. Although the third party platform 150 is described as enabling communication between servers 152 and with client devices 110A-110Z over the network 130 to store and share data, it can be understood that the implementations described herein may also apply to systems that are locally interconnected.

In some implementations, third party platform 150 may embed services of cloud-based storage system 101 into a third party application hosted at third party platform 150. In some implementations, the third party application may be a stand-alone application downloaded to the client device 110A-110Z and natively running on the client devices 110A-110Z. In other implementations, the third party application may be a web application hosted by server 152 and may provide a third party GUI 162A, such as a webpage, to be rendered by a web browser and displayed on the client device 110A-110Z in a web browser window to access services offered by the third party application.

In some implementations, a first party customized GUI 117 (also referred to as a "customized GUI" herein) may be a GUI of the cloud-based storage system 101 used by users of the third party platform 150 to access one or more of the electronic document editing applications hosted by servers 112 of cloud-based storage system 101. In implementations, the customized GUI 117 may be embedded into a third party GUI 162Z of the third party platform 150 using an inline frame (iframe) that is added to the GUI (e.g., webpage) of the third party platform 150. For example, the iframe may send a request to cloud-based storage system 101 to retrieve the customized GUI 117 stored at data store 114 for display within the third party GUI 162Z of client device 110Z. The iframe may refer to a structural tag of HTML source code (e.g., the <iframe> tag) of a webpage of a browser. The customized GUI 117 can be displayed in an area (e.g., frame) of the third party webpage defined by the structural tag (e.g., the <iframe> tag).

In some implementations, third party platform 150 may provide third party GUI elements 164A-164Z (generally referred to as "GUI element(s) 164" herein). Selection of a GUI element may indicate a request of a third party user to manipulate an electronic document of a particular electronic document type. For example, application B may be a word processing application associated with electronic documents of the word processing type. Application B GUI elements 164B may include a "create document" GUI element, an "open document" GUI element, a "save document" GUI element, and so forth. Selecting any one of the application B GUI elements 164B may cause the iframe in the third party GUI 162A to send a request to cloud-based storage system 101 to provide the respective customized GUI associated with a word processing application hosted by cloud-based storage system 101. For instance, responsive to a third party user selecting a "create document" GUI element of the application B GUI elements 164B in the third party GUI 162A, the iframe in the third party GUI 162A may send a request to application B server 112B of cloud-based storage system 101 to retrieve the customized GUI for application B hosted by cloud-based storage system 101. The retrieved customized GUI may be provided for presentation in the iframe of the third party GUI 162A (as illustrated in third party GUI 162Z). The customized GUI may present the blank electronic document and GUI components selected by the third party platform 150.

It can be noted that storage GUI elements 164A of third party platform 150 correspond to storage server 112A of cloud-based storage system 101 (e.g., used by third party users to manipulate an electronic document via the storage application hosted by storage server 112A). Application B GUI elements 164B of third party platform 150 correspond to application B server 112B of cloud-based storage system 101. Application Z GUI elements 164Z of third party platform 150 correspond to application Z server 112Z of cloud-based storage system 101. In implementations, the client device 110 using for example, an iframe (and corresponding source code), can communicate with cloud-based storage system 101 using an application programming interface (API). An API may refer to a set of subroutine definitions, protocols, or tools for building software to communicate between various components (e.g., between third party platform 150 and cloud-based storage system 101). In implementations, each of the different services corresponding to servers 112 may have a different API 120A-120Z (generally referred to as "API(s) 120" herein). For example, third party platform 150 may communicate with storage application associated with storage server 112A using storage API 120A. Third party platform 150 may communicate with application B associated with storage server 112B using application B API 120B. Third party platform 150 may communicate with application Z associated with application Z server 112Z using application Z API 120Z.

In some implementations, the iframe (and associated source code) may be received from cloud-based storage system 101 and integrated by third party platform 150 into the third party GUI 162. In other implementations, the iframe may be created by the third party platform 150 using, for example, an API specification provided by the cloud-based storage system 101.

In implementations, one or more of the servers 112A-112Z may provide a collaborative document environment (generally referred to as "collaborative document environment(s)" herein) to the client devices 110A-110Z via the customized GUIs embedded in the third party GUIs 162. The server 112A-112Z selected to provide the collaborative document environment may be based on certain load-balancing techniques, service level agreements, performance indicators, application, or the like. The customized GUI 117 may display a collaborative document generated based on content in the one or more data files 116 or data files 156.

The collaborative document environment may enable users using different client devices 110A-110Z to concurrently access the collaborative document to review, edit, view, or propose changes to the collaborative document in a respective customized GUI 117.

In an implementation, the customized GUIs may be webpages embedded in a third party GUIs 162, which may also be webpages. The customized GUIs 117 or third party webpages may be rendered by a web browser and displayed at the client device 110A-110Z in a web browser window. In another implementation, the customized GUIs 117 may be embedded in a stand-alone third party application downloaded to the client device 110A-110Z and natively running on the client devices 110A-110Z (also referred to as a "native application" or "native client application" herein).

The client devices 110A-110Z may include one or more processing devices communicatively coupled to memory devices and I/O devices. The client devices 110A-110Z may be desktop computers, laptop computers, tablet computers, mobile phones (e.g., smartphones), or any suitable computing device. The client device 110A-110Z may include components, such as an input device and an output device. A third party user may be authenticated by the server 112A-112Z using a username and password (or other identification information) provided by a user via the third party platform 150, such that the same client device 110A-110Z may be used by different users at different times.

As discussed above, the client devices 110A-110Z may each include a web browser or a native client application. A user that is invited and becomes a collaborator of the collaborative document may request to access the collaborative document via the web browser or the native client application. For example, the user may select the collaborative document from the third party GUI 162 provided by the third play platform 150 and presented by the web browser or the native client application. As such, the client device 110A associated with the user may request the collaborative document from the cloud-based storage system 101 via an iframe. The collaborative document environment may enable a user to view or manage collaborative documents within a respective customized GUI 117.

The collaborative document environment may also enable users using different client devices 110A-110Z to simultaneously access the collaborative document to comment on, edit (e.g., modify or suggest changes), or view the collaborative document in a respective customized GUI 117 of the respective collaborative application (e.g., collaborative slide presentation application, collaborative word processing application, collaborative spreadsheet application, etc.) that presents the collaborative document.

In some implementations, cloud-based storage system 101 may execute embedding modules 118A-118Z to allow third party platforms to embed services offered by cloud-based storage system 101. In some implementations, the embedding modules 118A-118Z may be a part of client device 110A-110Z or third party platform 150. In other implementations, operations of embedding modules 118A-118Z may be divided among servers 112A-112Z, client devices 110A-110Z, or third party platform 150.

In situations in which the systems discussed here collect personal information about users, or may make use of personal information, the users may be provided with an opportunity to control whether the cloud-based storage system 101 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the cloud-based storage system 101.

Figure 2A:
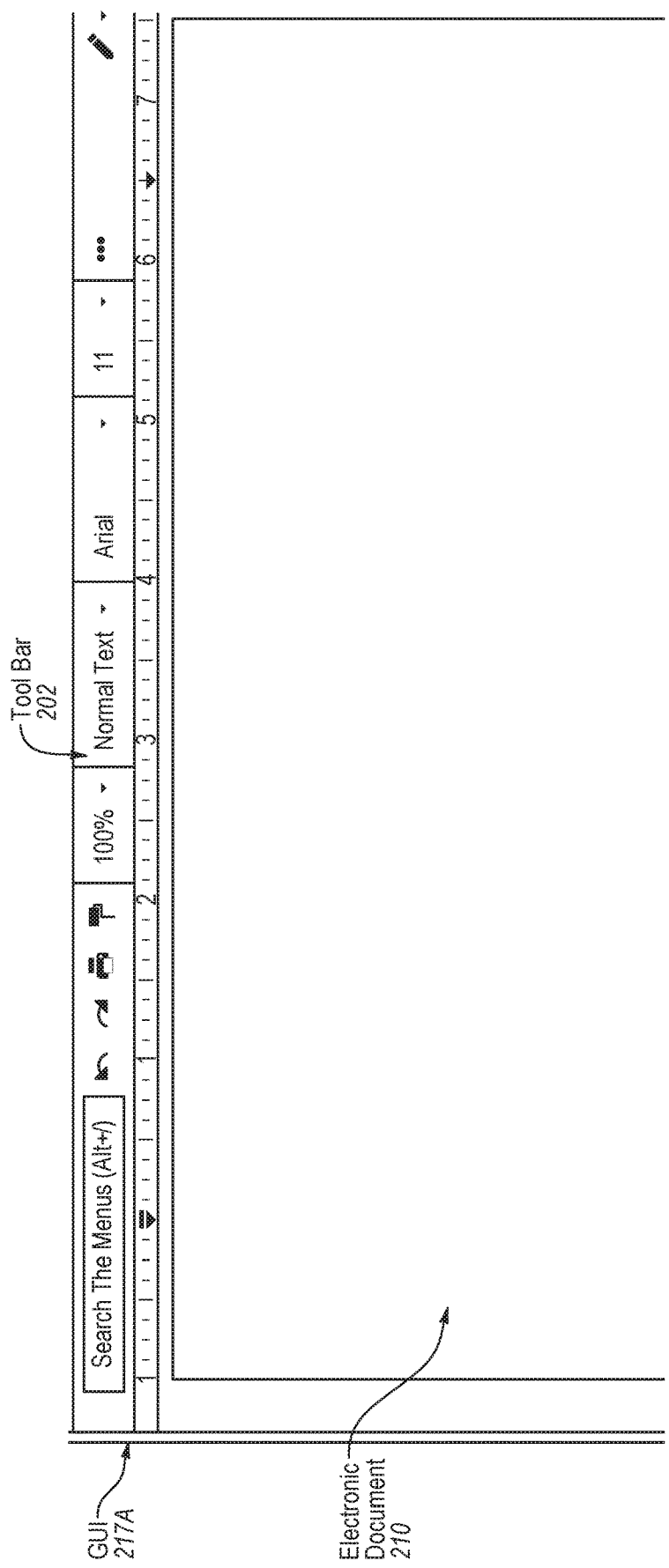
FIG. 2A illustrates a GUI of an electronic document editing application received from a cloud-based storage system, in accordance with implementations of the disclosure.
Figure 2B:
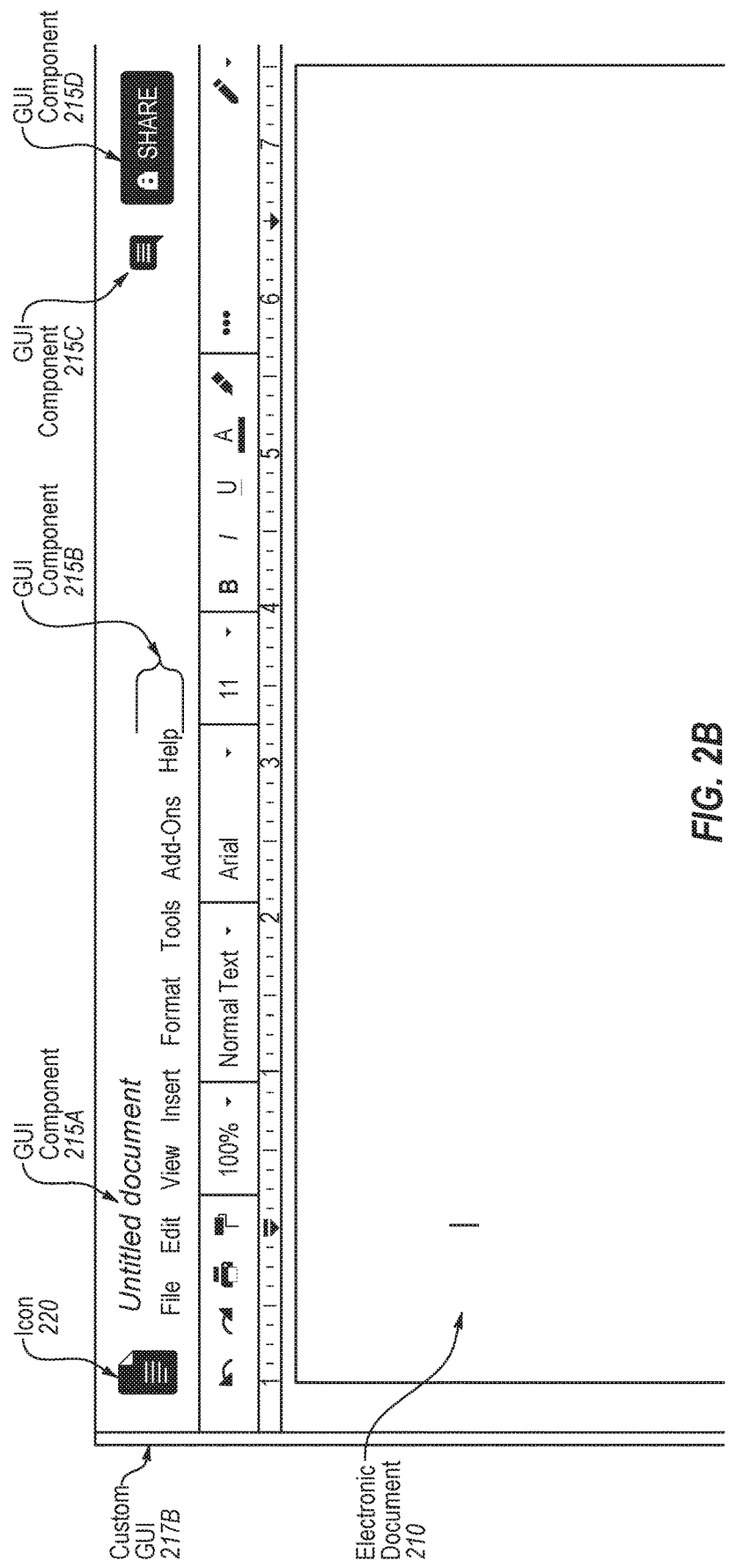
FIG. 2B illustrates a customized GUI of an electronic document editing application, in accordance with implementations of the disclosure.

FIG. 2A-2B illustrate customization of a graphical user interface provided by a cloud-based storage system to a user of a third party platform, in accordance with implementations of the disclosure. Elements of FIG. 1 are used in FIG. 2 to help illustrate aspects of the disclosure. It can be noted that GUIs 217A and 217B (generally referred to as "GUI(s) 217" herein) and may be similar to custom GUIs 117 described with respect to FIG. 1.

FIG. 2A illustrates a GUI of an electronic document editing application received from cloud-based storage system, in accordance with implementations of the disclosure. In implementations, a first user, such as an administrator of third party platform 150, may send a request to the cloud-based storage system 101 to customize a GUI of an electronic document editing application hosted by cloud-based storage system 101. In the current illustration, the electronic document editing application is a word processing application. The electronic document type is a word processing electronic document type.

In implementations, in response to the request to customize the GUI of an electronic document editing application, cloud-based storage system 101 may send the requested GUI of the electronic document editing application to the third party platform 150 for customization. As illustrated in FIG. 2A, a GUI 217A of the word processing application is sent to the third party platform 150. The GUI 217A is an example of GUI sent prior to customization by the third party platform 150. GUI 217A is an example of a template GUI that includes a tool bar 202 and an electronic document 210 (e.g., blank electronic document) and that the first user of the third party platform 150 can customize. It can be noted that each of the electronic document editing applications provided by the cloud-based storage system 101 can have a different GUI that can be customized in a similar manner as described herein.

FIG. 2B illustrates a customized GUI of an electronic document editing application, in accordance with implementations of the disclosure. In implementations, the first user of the third party platform 150 may use tools offered by cloud-based storage system 101 to add or remove one or more GUI components 215A-215D (generally referred to as "GUI component(s) 215" herein). Each of the GUI components 215 can be associated with a feature of the particular electronic document editing application. In implementations, a feature may provide additional functionality to the second users (e.g., clients of third party platform 150) using the electronic document editing application via the customized GUI 217B. In some implementations, the GUI components 215 may initiate particular API calls to be sent to the cloud-based storage system 101 to invoke the associated features. FIG. 2B illustrates the addition of GUI components 215A-215D and icon 220 to the customized GUI 217B.

For example, GUI component 215D illustrates a share GUI component that enables a share feature. The share feature allows second users of the customized GUI 217B to share the electronic document 210 with other second users of third party platform 150. Additionally, the share feature allows electronic document 210 to be used as a collaborative document that enables second users to concurrently edit electronic document 210 and view each other's edits in real-time (as further discussed with respect to FIG. 1). The selection of GUI component 215D by a second user using customized GUI 217B may cause the iframe in the third party GUI 162A to send one or more API calls to initiate the execution of operations associated with the share feature by cloud-based storage system 101.

GUI component 215C illustrates a comment GUI component that enables a comment feature. The comment feature may allow second users to comment on the electronic document 210 and control the appearance of the comments. Comments may also be shared with other second users of electronic document 210. GUI component 215A illustrates a title GUI component that allows second users to add or change a title of the electronic document 210. GUI components 215B illustrate tab GUIs that enable other features. Each of the tab GUIs may invoke a drop down menu to appear that includes additional GUI components. The features included herein, are provided for purposes of illustration rather than limitation. Additional features may include file management features that allow third party users to view and manage files stored at cloud-based storage system 101 or third party platform 150 or embedding security features that prevent clickjacking using the customized GUI 217.

In some implementations, the additional features may include document security features. For example, an owner of the electronic document may be able to set permission levels for the electronic document 210 for other third party users as described with respect to FIG. 1. In another example, portions of the document may have different permission levels. For instance, some third party users with low permission levels may not be able to edit certain portions of the electronic document 210 (e.g., protected ranges).

In some implementations, the additional features may include access to training machine learning models or access to trained machine learning models that offer machine intelligence functionality to the third party platform 150. For example, a feature may include automatic format suggestions using a trained machine learning model, where the format suggestions are provided to a second user while the second user is editing the electronic document 210. In another example, a feature may include natural language processing using a trained machine learning model that may allow a second user to use speech-to-text features of the electronic document 210. In still another example, a feature may include automatic visualization suggestions that aggregate data of an electronic document 210 and provide varies types of charts, such as bar charts, pie charts, lines charts, etc., that represent the aggregated data.

In implementations, the machine learning model may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. Once the machine learning model is trained using a training engine, the model may be referred to as a trained machine learning model.

In some implementations, the additional features may include the ability to use the electronic document editing application with electronic documents stored at third party platform 150 (as further described with respect to FIG. 6), electronic documents stored at cloud-based storage system 101 (as further described with respect to FIG. 5), or both.

In still other implementations, the first user may change the appearance of the customized GUI 217B. For example, cloud-based storage system 101 may provide tools to change the color or texture of customized GUI 217B to match that of the third party GUI 162A. In another example, the first user may change the arrangement of GUI elements including GUI components 215 or add icons, such as icon 220, to indicate an electronic document type of the particular electronic document 210.

In implementations, responsive to receiving input of the first user indicating the selection of one or more of the GUI components 215 associated with respective features of the electronic document editing application, the GUI 217B is customized. Cloud-based storage system 101 may store the customized GUI 217B of the electronic document editing application. The cloud-based storage system 101 may associated the customized GUI 217B with the third party platform 150.

In implementations, third party platform 150 may embed the customized GUI 217B into the third party GUI 162A of the third party platform 150. For example, the customized GUI 217B may be associated with a particular resource locator, such as a uniform resource locator (URL). Cloud-based storage system 101 may generate the resource locator. Cloud-based storage system 101 may send the resource locator to the third party platform 150. Third party platform 150 may include the resource locator in the third party GUI 162A. For instance, the third party platform 150 may include the resource locator in the iframe in the third party GUI 162A. The iframe may request the customized GUI 217B by requesting the respective resource locator.

In some implementations, a second user (e.g., client of third party platform 150) may select GUI element 164 of third party GUI 162A. The selection of GUI element 164 may initiate a signal, which may be an indication of a request of the second user of the third party platform 150 to manipulate the electronic document 210 of a first electronic document type. Responsive to the selection of the GUI element 164, the respective iframe may send an indication of the request of the second user to manipulate the electronic document 210. For example, the iframe may send the resource locator and appropriate API to cloud-based storage system 101. Cloud-based storage system 101 may identify the appropriate customized GUI 217B and provide the customized GUI 217B of the electronic document editing application to the iframe of the third party GUI 162A at the client device 110. The customized GUI 217B may use APIs associated with the electronic document editing application to allow the second user to manipulate the electronic document 210.

In an alternative implementation, third party platform 150 may send to cloud-based storage system 101 a specification of features request by the third party platform 150 for inclusion in the customized GUI 217B. Cloud-based storage system 101 may generate a customized GUI 217B based on the specification, associated the customized GUI 217B with third party platform 15, and send the third party platform 150 the respective resource locator for embedding into the third party GUI.

Figure 3:
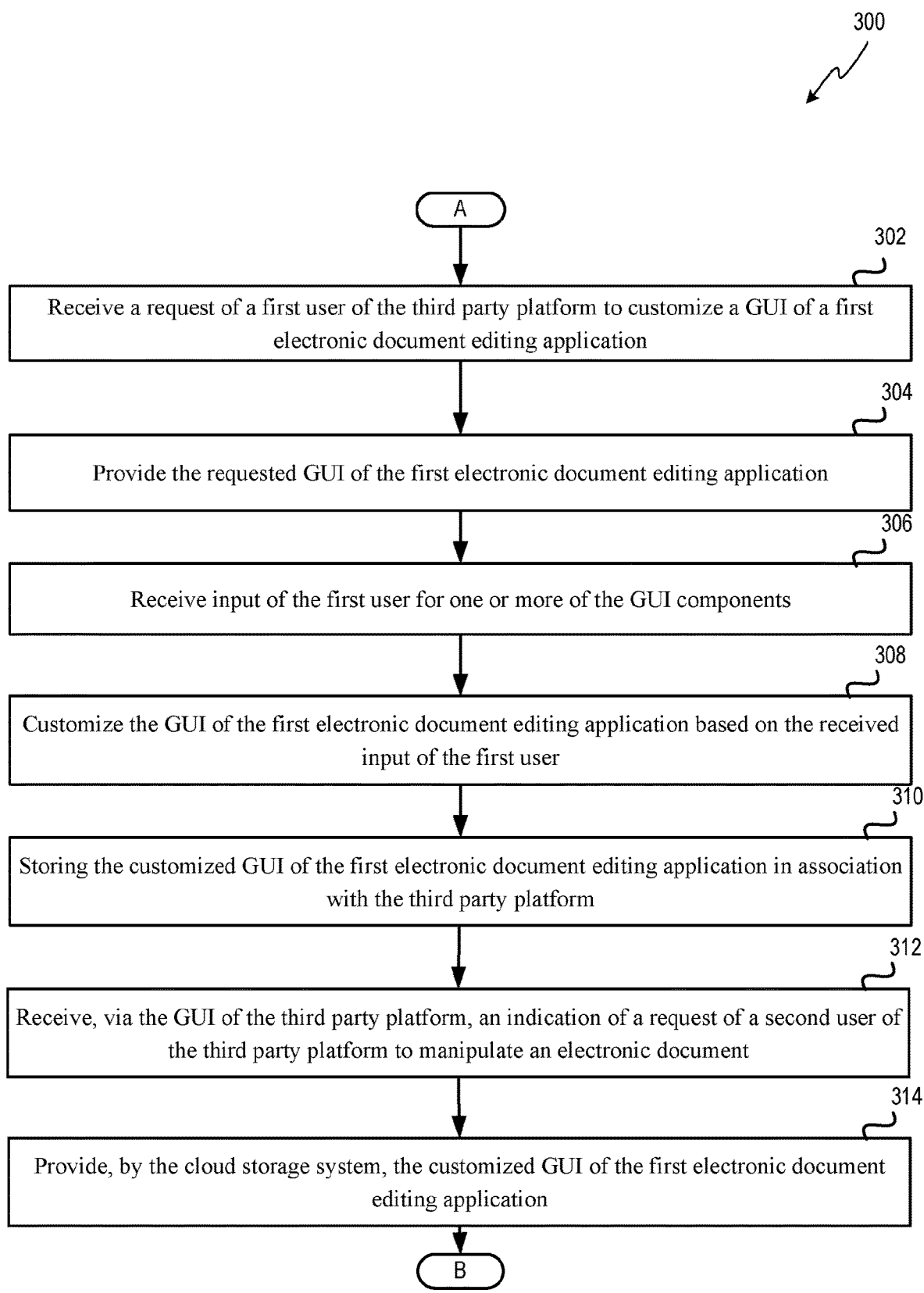
FIG. 3 is a flow diagram illustrating a method for customizing a GUI of an electronic document editing application provided by a cloud-based storage system for users of a third party platform, in accordance with implementations of the disclosure.

FIG. 3 is a flow diagram illustrating method 300 for customizing a GUI of an electronic document editing application hosted by a cloud-based storage system for users of a third party platform, in accordance with implementations of the disclosure. Method 300 may be performed by processing logic that includes hardware (e.g., circuitry, dedicated logic, programmable logic, microcode), software (e.g., instructions run on a processing device to perform hardware simulation), or a combination thereof. In other implementations, embedding module 118 executing at server(s) 112 may perform some or all the operations. In some implementations, embedding module 118 executing at client device 110 and server(s) 112 may perform some or all the operations. Elements of FIGS. 1 and 2 may be used to help illustrate method 300. It may be noted that the in some implementations, method 300 may include the same, different, fewer, or greater number of operations performed in any order.

At block 302, processing logic executing method 300 receives a request of a first user of the third party platform 150 to customize a GUI 217A of a first electronic document editing application of multiple electronic document editing applications provided by the cloud-based storage system 101. Each of the electronic document editing applications configured to manipulate electronic documents of a particular one of a plurality of different electronic document types.

At block 304, processing logic provides to third party platform 150 the requested GUI 217A of the first electronic document editing application associated with a first electronic document type.

At block 306, processing logic receives input of the first user of third party platform 150 for one or more of the GUI components 215 associated with features of the first electronic document editing application.

In some implementations, other features associated with other GUI components that were not selected by the first user of third party platform 150 to include in the customized GUI 217B of the respective electronic document editing application are not made available to second users of the third party platform 150.

At block 308, processing logic customizes the GUI 217B of the first electronic document editing application based on the received input of the first user.

At block 310, processing logic stores the customized GUI 217B of the first electronic document editing application in association with an identifier of the third party platform 150. The customized GUI 217B may be embedded into a GUI 162 of the third party platform 150. It can be noted that in some implementations, any of the blocks 302 through 310 may be repeated to customize GUIs of one or more of the other electronic document editing applications hosted by cloud-based storage system 101. It can be noted that in some implementations, method 300 may complete after block 310.

In some implementations, the customized GUI 217B is embedded into the GUI 162 of the third party platform 150 via an inline frame (iframe) added to the GUI 162 of the third party platform 150.

At block 312, processing logic receives, via the GUI 162 of the third party platform 150, an indication of a request of a second user of the third party platform 150 to manipulate an electronic document 210 of the first electronic document type.

At block 314, upon receiving the indication of the request of the second user to manipulate the electronic document 210 of the first electronic document type, processing logic provides the customized GUI 217B of the first electronic document editing application. The customized GUI 217B uses an API 120 associated with the first electronic document editing application to allow the second user to manipulate the electronic document 210 of the first electronic document type.

Figure 4:
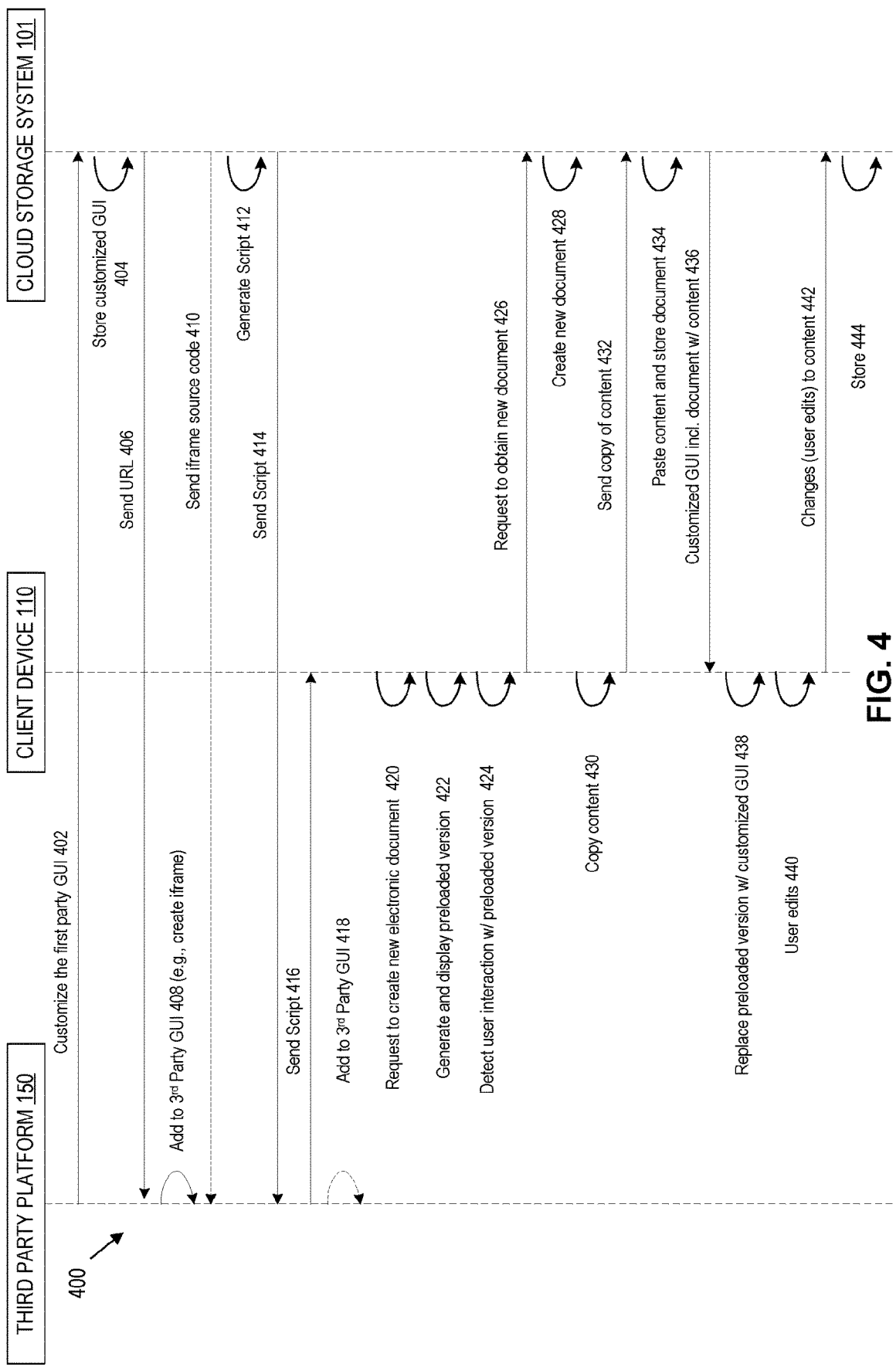
FIG. 4 is a diagram of operations for providing a preloaded version of the customized GUI, in accordance with implementations of the disclosure.

FIG. 4 is a diagram of operations for providing a preloaded version of the customized GUI, in accordance with implementations of the disclosure. System 400 may include similar components as system architecture 100 of FIG. 1. It may be noted that components of FIG. 1 may be used to help describe FIG. 4. For purposes of illustration, rather than limitation operations described as performed by third party platform 150, client device 110, or cloud-based storage system 101 may be performed by any component thereof, unless otherwise described. The operations described with respect to FIG. 4 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 402, a first user, such as an administrator of third party platform 150 selects one or more GUI components associated with the features of an electronic document editing application. The selections are received by cloud-based storage system 101. The customized GUI 217 is created for the third party platform 150.

At operation 404, third party platform 150 stores the customized GUI 217. The customized GUI 217 can be associated with an identifier of the third party platform 150. As described above, third party platform 150 may customize GUIs for any of the electronic document editing applications provided by cloud-based storage system 101 in a similar manner as described herein.

At operation 406, cloud-based storage system 101 determines a resource locator, such as a URL, for the customized GUI 217. Cloud-based storage system 101 sends the resource locator to the third party platform 150.

At operation 408, third party platform 150 adds the resource locator received from cloud-based storage system 101 to the third party GUI 162 to embed the customized GUI 217 into the third party application. In some implementations, the resource locator is added to an iframe. The third party GUI 162 may be a third party webpage rendered by a browser at client device 110. Third party platform 150 may add the iframe that includes the resource locator to the third party webpage.

At operation 410, cloud-based storage system 101 may send an iframe (e.g., source code) to the third party platform 150. The third party platform 150 may use some or all of the source code to add the iframe into the third party GUI 162. Operation is 410 is an alternative or optional operation as indicated by the dashed line.

At operation 412, cloud-based storage system 101 creates or generates a script 119A based on the customized GUI 217. The script 119A may be used to generate a preloaded version of the customized GUI 217 to preload for presentation at the client device 110. In some implementations, the preloaded version may be a copy of the customized GUI 217. In some implementations, the preloaded version may be similar to the customized GUI 217 but not an exact copy. In implementations, the preloaded version includes GUI components selected by the third party platform 150 and an electronic document 210, such as a blank electronic document.

In implementations, the preloaded version of the customized GUI 217 that is preloaded for presentation at the client device 110 allows the second user of third party platform 150 to manipulate the electronic document 210 without delay from obtaining the customized GUI 217 from the cloud-based storage system 101.

At operation 414, once the script 119A is generated the script 119A is stored at cloud-based storage system 101. A copy of script 119A (e.g., script 119B) may be transmitted to third party platform 150. Third party platform 150 may store the script 119B At operation 416, third party platform 150 sends a copy of the script 119B to client device 110. Client device 110 may store or install the script 119B.

At operation 418, third party platform 150 may add the script 119B to the third party GUI 162. In some implementations, the script 119B may be added to a third party webpage. Operation 410 is an alternative or optional operation as indicated by the dashed line.

At operation 420, a second user of third party platform 150 using client device 110 requests to create a new electronic document 210 of a particular electronic document type. In some implementations, the second user may select a third party GUI element (e.g., GUI elements 164) in the third party GUI 162. The third party GUI element may be associated with a particular electronic document editing application. For example, the third party GUI element may be "create new word processing document." In implementations, the third party GUI 162 may be a third party webpage rendered by a browser at the client device 110.

At operation 422, in response to the request to create a new electronic document, script 119A at client device 110 is executed (e.g., by webworkers) and generates a preloaded version of the customized GUI 217 in local memory of the client device 110. In some implementations, the local memory is associated with a browser that presents the third party GUI 162. The preloaded version of the customized GUI 217 displays a blank electronic document when the preloaded version of the customized GUI is rendered as part of the third party GUI 162. In some implementations, local memory may include volatile memory, such as cache memory. In some implementations, local memory may include volatile memory, rather than non-volatile memory such as Flash memory or disk storage.

For example, a second user of client device 110 may request to create a new document using one or more third party GUI elements 164. The request may call a third party webpage that has an iframe to embed the customized GUI 217. The browser may detect the particular third party webpage and inject script 119A into the third party webpage loaded in the browser. The preloaded version of the customized GUI 217 can be generated in local memory. The preloaded version of the customized GUI 217 can be overlaid or provided in the iframe of the third party webpage.

At operation 424, client device 110 detects a user interaction with the preloaded version customized GUI 217. In implementations, the client device 110 detects a user interaction with the blank electronic document in the preloaded version of the customized GUI 217. For example, the user interaction with the preloaded version may include a second user selecting the preloaded version of customized GUI 217 or a second user placing a cursor over the preloaded version of the customized GUI 217. In another example, the user interaction may include adding content to the blank electronic document of the preloaded version of the customized GUI 217. It may be noted that the user interaction may include other actions taken by the user with respect to the preloaded version of the customized GUI 217.

At operation 426, responsive to the user interaction with the preloaded version of the customized GUI 217, client device 110 sends a request to cloud-based storage system 101 to obtain the customized GUI 217 from the cloud-based storage system 101 to replace the preloaded version of the customized GUI 217 presented as part of the third party GUI 162. The request may include an electronic document editing application identifier to identify the particular electronic document editing application to which the request is to be sent.

In some implementations, the script 119B causes the client device 110 to send a request to obtain the customized GUI 217 from cloud-based storage system 101. In implementations, script 119B causes the iframe to send an API call to the respective API 120 of the electronic document editing application identified by electronic document editing application identifier. The API call may request the customized GUI 217 stored at cloud-based storage system 101. The customized GUI 217 from the cloud-based storage system 101 may be used by client device 110 to replace the preloaded version of the customized GUI 217 presented as part of the third party GUI 162.

The request sent to cloud-based storage system 101 to obtain the customized GUI 217 is described as responsive to user interaction with the preloaded version of the customized GUI 217 for purposes of illustration rather than limitation. In other implementations, the request sent to cloud-based storage system 101 to obtain the customized GUI 217 may be responsive to one or more other or different factors. In implementations, the request to create a new electronic document may use a GUI element 164 of third party GUI 162 and may cause the execution of the script 119A to generate the preloaded version of the customized GUI and initiate a request to be sent to cloud-based storage system 101 to obtain the customized GUI 217. The preloaded version of the customized GUI 217 may be displayed in the third party GUI 162 until the customized GUI 217 is received and presented at the client device 110. The preloaded version of the customized GUI may therefore be presented at the client device 110 whilst the customized GUI 217 is generated and transmitted to the client device 110 such that the user does not experience latency in the provision of the customized GUI.

At operation 428, responsive to receiving the receiving the request to obtain a new electronic document 210, cloud-based storage system 101 creates a new electronic document 210. If the user has not added content to the blank electronic document of preloaded version of the customized GUI 217, cloud-based storage system 101 may proceed to operation 436 and send the customized GUI 217 with the blank electronic document to client device 110.

At operation 430, the script 119B determines that the user interaction with the blank electronic document of the preloaded version of the customized GUI 217 adds content to the blank electronic document. The script 119B may cause client device 110 to copy the content added to the blank electronic document of preloaded version of the customized GUI 217. For example, the script 119B may cause the third party webpage or iframe in the third party webpage to copy the content added to the blank electronic document of the preloaded version of the customized GUI 217.

At operation 432, client device 110 sends a copy of the content added to the blank electronic document of preloaded version of the customized GUI 217 to cloud-based storage system 101. In some implementations, the script 119B causes a copy of the content to be sent to the cloud-based storage system 101 to be included in the customized GUI 217 when the customized GUI 217 replaces the preloaded version of the customized GUI 217. In one implementation, responsive to detecting content has been added to the blank electronic document of preloaded version of the customized GUI 217, the script 119B cause the iframe at the third party GUI to send the copied content to the cloud-based storage system 101. The iframe may send an API call to the appropriate API 120 of cloud-based storage system 101.

At operation 434, cloud-based storage system 101 pastes the content received from client device 110 into the new document created at operation 428.

At operation 436, cloud-based storage system 101 provides to client device 110 the customized GUI 217 that includes an electronic document 210 of the appropriate electronic document type and the added content.

In an alternative implementation, script 119B may cause client device 110 to copy the content in the blank electronic document of the preloaded version of the customized GUI 217. Upon receiving the customized GUI 217 with the blank electronic document from cloud-based storage system 101, the script 119B may cause client device 110 to paste the content into blank electronic document of the customized GUI 217. The user may therefore input data prior to receipt of the customized GUI 217 at the client device and the user input is then transferred to the GUI 217. The user may therefore experience significantly reduced latency in the provision of a functioning user interface.

At operation 438, client device 110 receives the customized GUI 217 from cloud-based storage system 101. The client device 110 may replace the preloaded version of the customized GUI 217 with the customized GUI 217 received from cloud-based storage system 101. In some implementations, the script 119B (or third party GUI 162) removes the preloaded version of the customized GUI 217 overlaid on the area of the third party GUI 162 containing the iframe. The customized GUI 217 received by the iframe in the third party GUI 162 is presented to the second user of client device 110.

At operation 440, the client device 110 receives user edits added to the electronic document 210 of the customized GUI 217. For example, the second user may add additional content to the electronic document 210 of the customized GUI 217.

At operation 442, the user edits may be sent to cloud-based storage system 101. In implementations, the user edits may be sent to cloud-based storage system 101 using an API call sent by the iframe.

At operation 444, cloud-based storage system 101 may store the user edits at cloud-based storage system 101. It can be noted that in instances where electronic document 210 is a collaborative document, the user edits may be propagated to other instances of the electronic document concurrently being accessed by other second users. The user edits may be viewed in real-time at the other instances of the electronic document.

Figure 5:
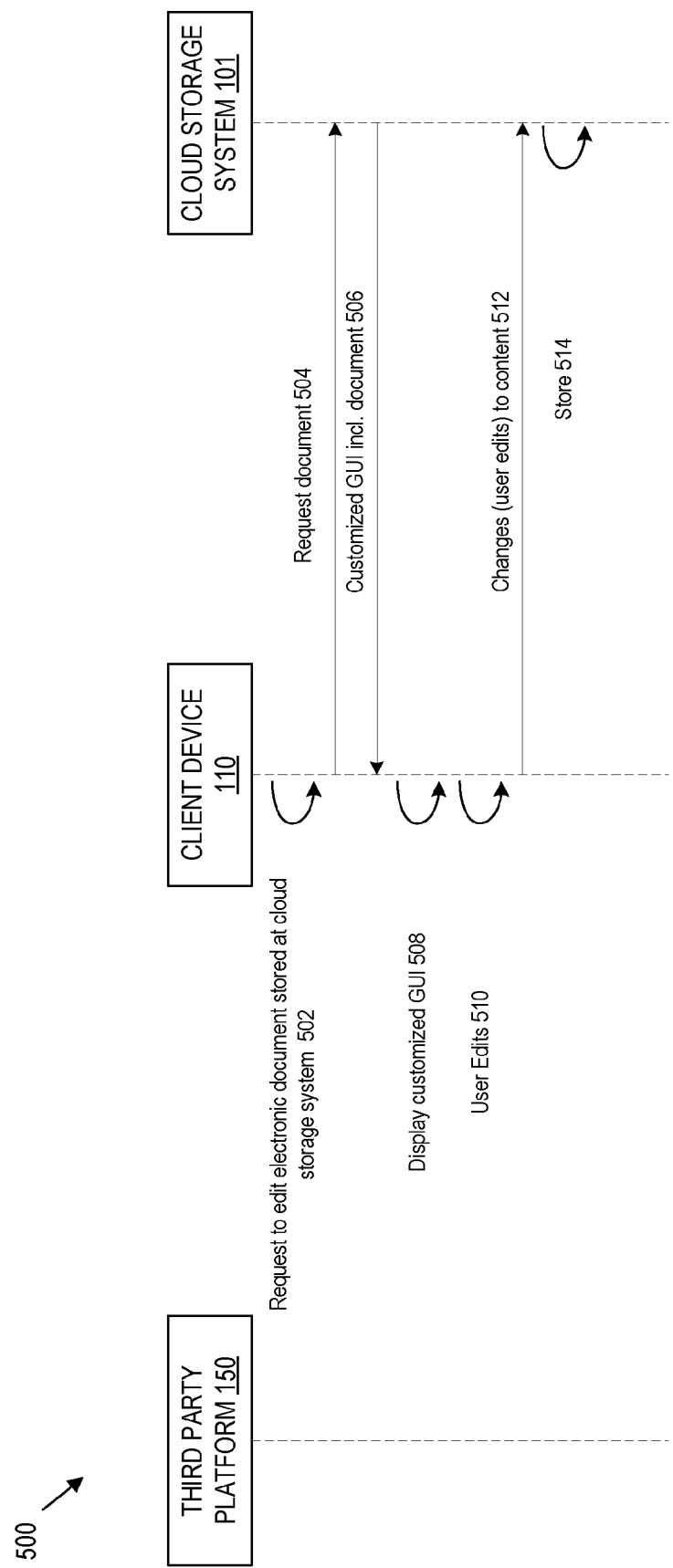
FIG. 5 is a diagram of operations for providing an electronic document stored at cloud-based storage system to a client device for editing, in accordance with implementations of the disclosure.

FIG. 5 is a diagram of operations for providing an electronic document stored at cloud-based storage system to a client device for editing, in accordance with implementations of the disclosure. System 500 may include similar components as system architecture 100 of FIG. 1. It may be noted that components of FIG. 1 or FIG. 2 may be used to help describe FIG. 5. For purposes of illustration, rather than limitation operations described as performed by third party platform 150, client device 110, or cloud-based storage system 101 may be performed by any component thereof, unless otherwise described. The operations described with respect to FIG. 5 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 502, a second user of third party platform 150 (e.g., user of client device 110) requests to edit an electronic document 210 of a particular electronic document type stored at cloud-based storage system 101. In some implementations, the second user may select a third party GUI element (e.g., GUI elements 164) in the third party GUI 162. The third party GUI element 164 may be associated with a particular electronic document editing application hosted at cloud-based storage system 101. For example, the third party GUI element 164 may be an "open word processing document" GUI element. In implementations, the third party GUI 162 includes a third party webpage rendered by a browser at the client device 110.

At operation 504, client device 110 sends a request to cloud-based storage system 101 to access an electronic document 210 stored at cloud-based storage system 101. The request may include an electronic document identifier used to identify the electronic document stored at cloud-based storage system 101. The request may include an electronic document editing application identifier to identify the particular electronic document editing application to which the request is to be sent. In implementations, the request causes the iframe to send an API call to the respective API 120 of the electronic document editing application identified by electronic document editing application identifier. The API call may request the electronic document 210 stored at cloud-based storage system 101.

At operation 506, cloud-based storage system 101 retrieves the customized GUI 217 for the particular electronic document editing application and associated with the third party platform 150. Cloud-based storage system 101 also retrieves the electronic document 210 from data store 114 using the electronic document identifier. The retrieved electronic document 210 is included in the customized GUI 217 and transmitted to client device 110.

At operation 508, client device 110 receives the customized GUI 217 with the requested electronic document 210. Client device 110 displays the customized GUI 217 with the requested electronic document 210. In implementations, the customized GUI 217 with the requested electronic document is received by the iframe in the third party GUI 162 and displayed in the iframe.

At operation 510, the client device 110 receives user edits added to the electronic document 210 of the customized GUI 217. For example, the second user may add additional content to the electronic document 210 of the customized GUI 217.

At operation 512, the user edits may be sent to cloud-based storage system 101. In implementations, the user edits may be sent to cloud-based storage system 101 using an API call sent by the iframe.

At operation 514, cloud-based storage system 101 may store the user edits at cloud-based storage system 101. It can be noted that in instances where electronic document 210 is a collaborative document, the user edits may be propagated to other instances of the electronic document concurrently being accessed by other second users. The user edits may be viewed in real-time at the other instances of the electronic document.

Figure 6:
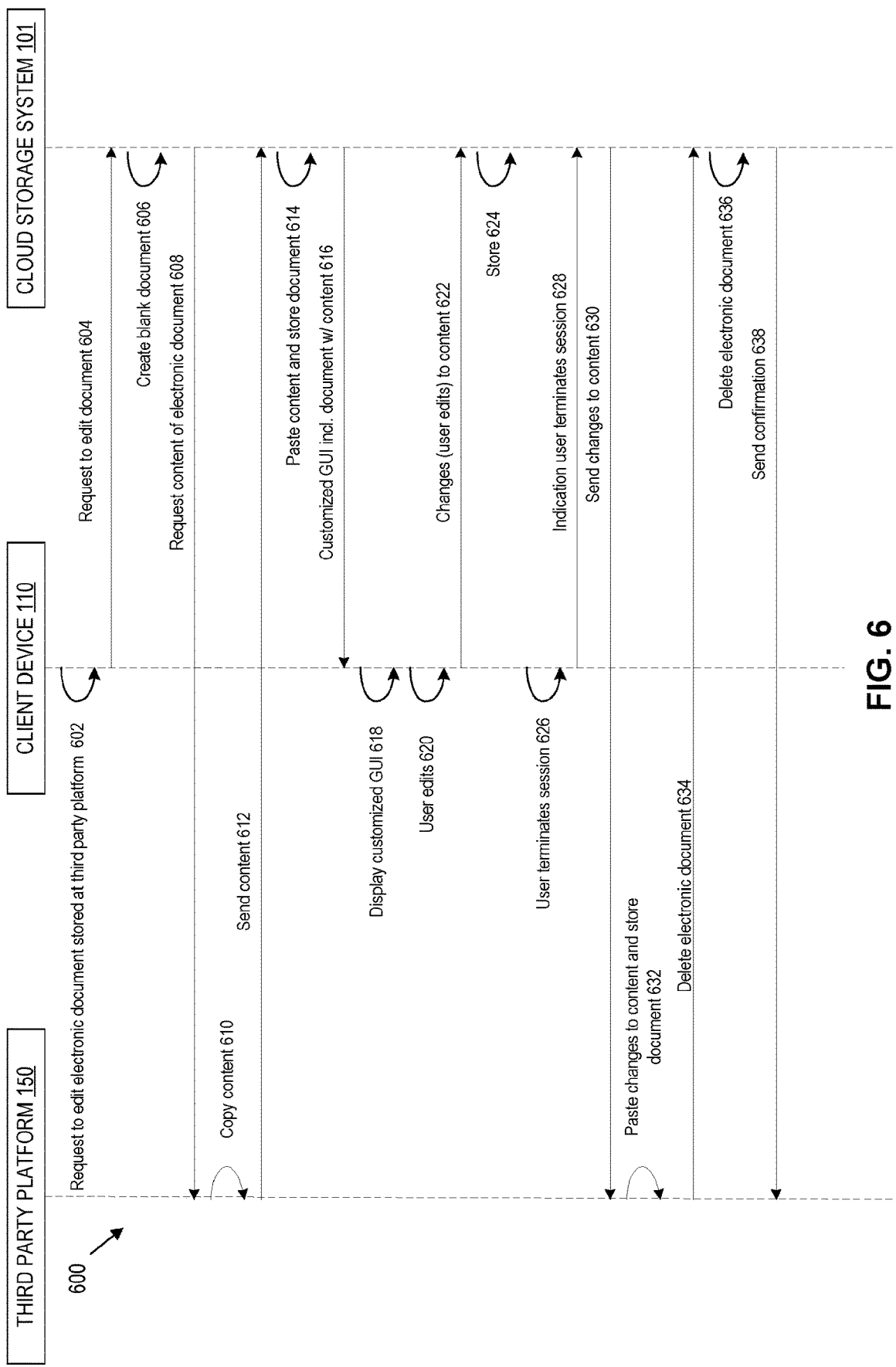
FIG. 6 is a diagram of operations for providing, using a customized GUI, an electronic document stored at third party platform to a client device for editing, in accordance with implementations of the disclosure.

FIG. 6 is a diagram of operations for providing an electronic document stored at third party platform to a client device for editing, in accordance with implementations of the disclosure. System 600 may include similar components as system architecture 100 of FIG. 1. It may be noted that components of FIG. 1 or FIG. 2 may be used to help describe FIG. 6. For purposes of illustration, rather than limitation operations described as performed by third party platform 150, client device 110, or cloud-based storage system 101 may be performed by any component thereof, unless otherwise described. The operations described with respect to FIG. 6 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order. The operations of FIG. 6 may allow user input at a customized user interface implemented at a client device to be processed using functionality provided by a remote server.

At operation 602, a second user of third party platform 150 (e.g., user of client device 110) requests to edit an electronic document 210 of a particular electronic document type stored at third party platform 150. For example, the electronic document may be stored at data store 154 of third party platform 150. In some implementations, the second user may select a third party GUI element (e.g., GUI elements 164) in the third party GUI 162. The third party GUI element 164 may be associated with a particular electronic document editing application hosted by cloud-based storage system 101. For example, the third party GUI element 164 may be an "open word processing document" GUI element. In implementations, the third party GUI 162 includes a third party webpage rendered by a browser at the client device 110.

At operation 604, client device 110 sends a request to cloud-based storage system 101 to access an electronic document 210 stored at third party platform 150. The request may include an electronic document identifier used to identify the electronic document stored at the third party platform 150. The request may also include a storage identifier identifying the location, such as a server location or data store location of the third party platform 150 at which the electronic document is located. The request may also include an electronic document type identifier that identifies the electronic document type of the electronic document stored at the third party platform 150 and requested by the second user. The request may include an electronic document editing application identifier to identify the particular electronic document editing application to which the request is to be sent. In implementations, the request causes the iframe to send an API call to the respective API 120 identified by the electronic document editing application identifier. The API call may request the electronic document stored at third party platform 150.

At operation 606, responsive to receiving the request to edit an electronic document stored at third party platform 150, cloud-based storage system 101 creates a blank electronic document of the electronic document type identified in the request. The blank electronic document may be an electronic document type that matches the electronic document type identified in the request. For example, the electronic document type identifier may identify a word processing electronic document type. Cloud-based storage system 101 may create a new blank word processing electronic document based on the electronic document type identifier.

At operation 608, cloud-based storage system 101 sends, to third party platform 150, a request for content of the electronic document stored at the third party platform 150.

In implementations, the request includes an API call to access an API of the third party platform 150. The request may include the electronic document identifier and the storage identifier received at operation 604.

At operation 610, third party platform 150 may copy the content of the electronic document identified by the electronic document identifier. As noted above, the electronic document stored at the third party platform 150 may have the same format type or a different format type as the electronic document created at cloud-based storage system 101.

At operation 612, third party platform 150 sends the copy of the requested content to cloud-based storage system 101. Cloud-based storage system 101 receives the requested content of the electronic document.

At operation 614, cloud-based storage system 101 modifies the blank electronic document by pasting the requested content into the blank electronic document created at operation 606.

At operation 616, cloud-based storage system 101 retrieves the customized GUI 217 (for the particular electronic document editing application) associated with the third party platform 150. Cloud-based storage system 101 also retrieves the modified electronic document (e.g., operation 614). The modified electronic document 210 is included in the customized GUI 217 and transmitted to client device 110. Cloud-based storage system 101 provides the modified electronic document for presentation to the second use in the customized GUI 217 of the electronic document editing application.

At operation 618, client device 110 receives the customized GUI 217 with the modified electronic document. Client device 110 displays the customized GUI 217 with the modified electronic document. In implementations, the customized GUI 217 with the modified electronic document is received by the iframe in the third party GUI 162 and is displayed in the iframe.

At operation 620, the client device 110 receives user edits (e.g., changes) to the content of the modified electronic document in the customized GUI 217. For example, the second user may add additional content to or remove content from the modified electronic document of the customized GUI 217.

At operation 622, the user edits may be sent to cloud-based storage system 101. In implementations, the user edits may be sent to cloud-based storage system 101 using an API call sent by the iframe in the third party GUI 162.

At operation 624, cloud-based storage system 101 may store the user edits at cloud-based storage system 101. It can be noted that in instances where electronic document 210 is a collaborative document, the user edits may be propagated to other instances of the electronic document concurrently being accessed by other second users. The user edits may be viewed in real-time at the other instances of the electronic document.

At operation 626, the second user may terminate the session to edit the modified electronic document. For example, the second user may close the third party GUI 162 in which the customized GUI 217 is embedded. In another example, the second user may be inactive for a threshold amount of time causing the session to edit the modified electronic document to terminate.

At operation 628, client device 110 sends an indication that the second user has terminated the session with the modified electronic document. For example, the iframe in the third party GUI 162 may send an API call indicating the session has been terminated.

At operation 630, cloud-based storage system 101 sends the changes to the content of the modified electronic document to the third party platform 150 for pasting into the electronic document stored at the third party platform 150. The changes are provided by the second user. In implementations, the transmission includes an API call to access an API of the third party platform 150. The transmission may include the electronic document identifier (of third party platform 150) and the storage identifier received at operation 604. The transmission may also include an additional electronic document identifier identifying the corresponding electronic document stored at cloud-based storage system 101. The transmission may also include electronic document editing application identifier to identify the particular electronic document editing application associated with the corresponding electronic document stored at cloud-based storage system 101. In other implementations, a copy of the content (e.g., changes and content provided at operation 612) of the electronic document may be sent to third party platform 150.

At operation 632, third party platform 150 pastes the content into the electronic document stored at third party platform 150 and identified by the electronic document identifier.

At operation 634, third party platform 150 sends a request to cloud-based storage system 101 to delete the corresponding modified electronic document stored at cloud-based storage system 101. Cloud-based storage system 101 receives the request of the third party platform 150 to delete the modified electronic document stored at the cloud-based storage system 101. The request can include the additional electronic document identifier received at operation 630. Third party platform 150 may send an API call to the respective API associated with the electronic document editing application identified by the electronic document editing application identifier received at operation 630.

At operation 636, responsive to the request of the third party platform 150 to delete the modified electronic document, cloud-based storage system 101 deletes the modified electronic document stored at cloud-based storage system 101.

At operation 638, cloud-based storage system 101 sends a confirmation to third party platform 150 confirming that the corresponding electronic document at cloud-based storage system 101 has been deleted.

Figure 7:
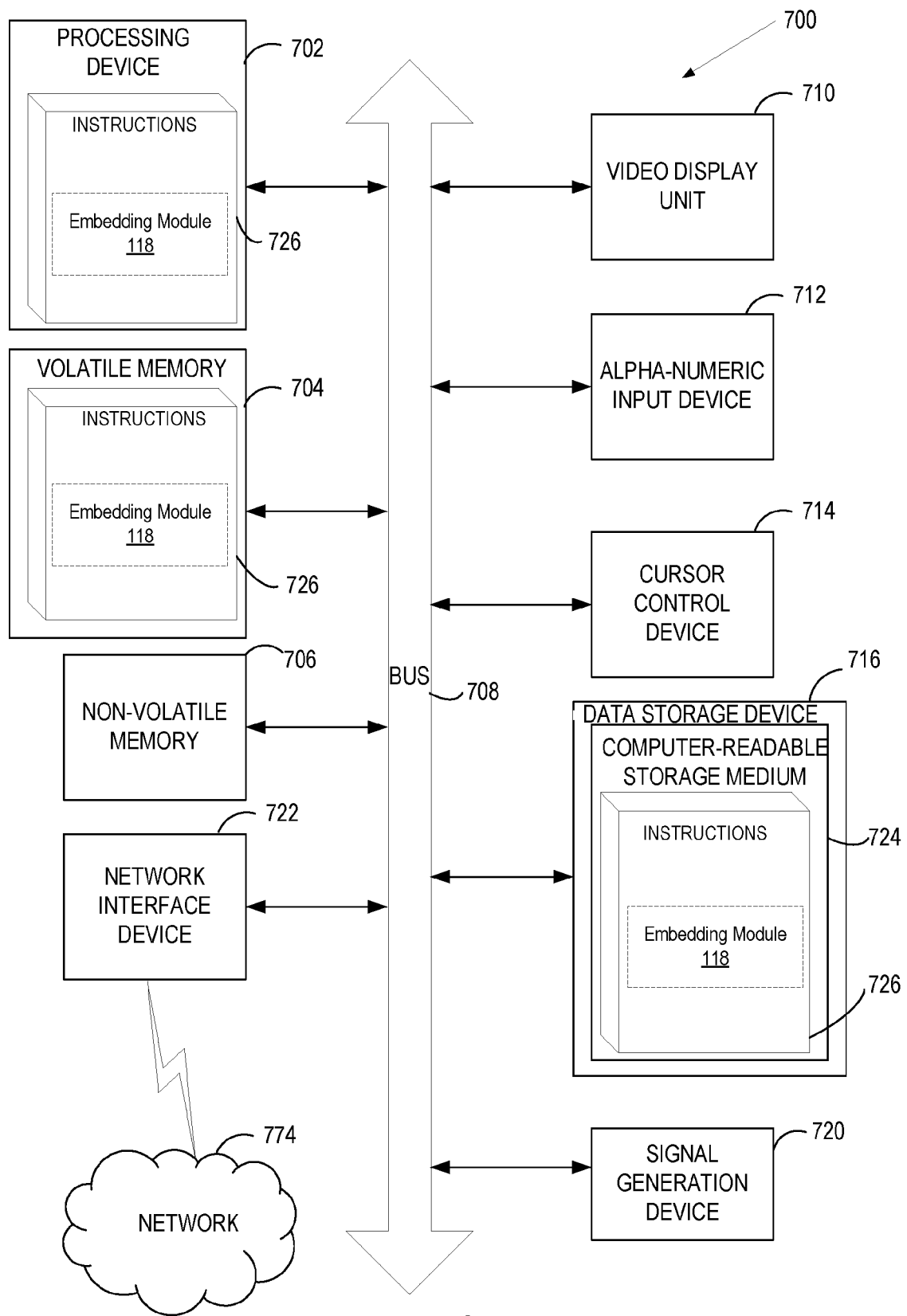
FIG. 7 depicts a block diagram of an example computing system operating in accordance with one or more aspects of the disclosure.

FIG. 7 depicts a block diagram of an example computing system operating in accordance with one or more aspects of the present disclosure. In various illustrative examples, computer system 700 may correspond to any of the computing devices within system architecture 100 of FIG. 1. In one implementation, the computer system 700 may be each of the servers 112A-112Z. In another implementation, the computer system 700 may be each of the client devices 110A-110Z.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a computer-readable storage medium 724 (which may be a non-transitory computer-readable storage medium, although the disclosure is not limited to this) which may store instructions 726 encoding any one or more of the methods or functions described herein, including instructions implementing the embedding module 118 (118A-118Z) of FIG. 1 for implementing any of the methods described herein.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "customizing", "providing", "storing", "creating", "modifying", "transmitting", "sending," "receiving", "deleting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it can be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not necessarily intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended, to be illustrative, and not restrictive. Many other implementations will be apparent to those of skill in the art upon reading and understanding the above description. The scope of the disclosure can, therefore, be determined with reference to the appended claims, along with the full scope of equivalents to which such claims are entitled.

What is claimed is:

1. A method to customize graphical user interfaces (GUIs) of a plurality of electronic document editing applications provided by a cloud storage system for users of a third party platform, the method comprising:

receiving, by the cloud storage system, a request of a first user of the third party platform to customize a GUI of a first electronic document editing application of the plurality of electronic document editing applications provided by the cloud storage system, each of the plurality of electronic document editing applications configured to manipulate electronic documents of a particular one of a plurality of different electronic document types;

providing, by the cloud storage system, the requested GUI of the first electronic document editing application for presentation at a client device associated with the first user, the first electronic document editing application associated with a first electronic document type;

receiving input of the first user for one or more of a plurality of GUI components of the requested GUI presented at the client device, the plurality of GUI components associated with features of the first electronic document editing application;

customizing the GUI of the first electronic document editing application based on the received input of the first user;

storing, at the cloud storage system, the customized GUI of the first electronic document editing application in association with an identifier of the third party platform, the customized GUI to be embedded into a GUI of the third party platform, wherein the third party platform hosts one or more services that are accessible via the GUI of the third party platform;

receiving, via the GUI of the third party platform, an indication of a request of a second user of the third party platform to manipulate an electronic document of the first electronic document type; and upon receiving the indication of the request of the second user to manipulate the electronic document of the first electronic document type, providing, by the cloud storage system, the customized GUI of the first electronic document editing application, wherein the customized GUI uses an application programming interface (API) that is associated with the first electronic document editing application and that is configured to allow the second user to manipulate, via the customized GUI, the electronic document of the first electronic document type.

2. The method of claim 1, wherein the customized GUI is embedded into the GUI of the third party platform via an inline frame (iframe) added to the GUI of the third party platform.

3. The method of claim 1, further comprising:
creating, based on the customized GUI, a script to generate a preloaded version of the customized GUI to preload for presentation to the second user to allow the second user to manipulate the electronic document without a delay resulting from obtaining the customized GUI from the cloud storage system; and
transmitting the script to the third party platform.

4. The method of claim 3, wherein:
the request of the second user to manipulate the electronic document of the first electronic document type is a request to create a new electronic document of the first electronic document type; and
the script is to generate, in response to the request to create the new electronic document, the preloaded version of the customized GUI in local memory associated with a browser that presents the GUI of the third party platform, the preloaded version of the customized GUI is to display a blank electronic document when the preloaded version of the customized GUI is rendered as part of the GUI of the third party platform.

5. The method of claim 4, wherein in response to user interaction with the preloaded version of the customized GUI, the script is to cause the customized GUI to be obtained from the cloud storage system to replace the preloaded version of the customized GUI presented as part of the GUI of the third party platform.

6. The method of claim 5, wherein:
the script is to determine that the user interaction with the blank electronic document adds content to the blank electronic document, and to cause a copy of the content to be sent to the cloud storage system to include in the customized GUI when the customized GUI replaces the presented preloaded version.

7. The method of claim 1, wherein other features associated with other of the plurality of GUI components that were not selected by the first user to include in the customized GUI of the respective electronic document editing application are not made available to the second user of the third party platform.

8. The method of claim 1, wherein:
the request of the second user to manipulate the electronic document of the first electronic document type is a request to edit an electronic document stored at the cloud storage system; and
providing the customized GUI of the first electronic document editing application comprises retrieving the electronic document from the cloud storage system, and providing the retrieved electronic document for presentation to the second user in the customized GUI of the first electronic document editing application.

9. The method of claim 1, wherein:
the request of the second user to manipulate the electronic document of the first electronic document type is a request to edit an electronic document stored at the third party platform; and
providing the customized GUI of the first electronic document editing application comprises:

creating, at the cloud storage system, a blank electronic document of the first electronic document type;
sending, to the third party platform, a request for content of the electronic document stored at the third party platform;
receiving the requested content of the electronic document;
modifying the blank electronic document by pasting the requested content into the blank electronic document of the first electronic document type; and
providing the modified electronic document for presentation to the second user in the customized GUI of the first electronic document editing application.

10. The method of claim 9, further comprising:
sending, to the third party platform, changes to the content of the modified electronic document for pasting into the electronic document stored at the third party platform, the changes provided by the second user.

11. The method of claim 9, further comprising:
receiving a request of the third party platform to delete the modified electronic document stored at the cloud storage system; and
responsive to the request of the third party platform to delete the modified electronic document, deleting the modified electronic document stored at the cloud storage system.

12. A system to customize graphical user interfaces (GUIs) of a plurality of electronic document editing applications provided by a cloud storage system for users of a third party platform, the system comprising:
a memory; and
a processing device, coupled to the memory, the processing device to:
receive, by the cloud storage system, a request of a first user of the third party platform to customize a GUI of a first electronic document editing application of the plurality of electronic document editing applications provided by the cloud storage system, each of the plurality of electronic document editing applications configured to manipulate electronic documents of a particular one of a plurality of different electronic document types;
provide, by the cloud storage system, the requested GUI of the first electronic document editing application for presentation at a client device associated with the first user, the first electronic document editing application associated with a first electronic document type;
receive input of the first user for one or more of a plurality of GUI components of the requested GUI presented at the client device, the plurality of GUI components associated with features of the first electronic document editing application;
customize the GUI of the first electronic document editing application based on the received input of the first user;
store, at the cloud storage system, the customized GUI of the first electronic document editing application in association with an identifier the third party platform, the customized GUI to be embedded into a GUI of the third party platform, wherein the third party platform hosts one or more services that are accessible via the GUI of the third party platform;
receive, via the GUI of the third party platform, an indication of a request of a second user of the third party platform to manipulate an electronic document of the first electronic document type; and upon receiving the indication of the request of the second user to manipulate the electronic document of the first electronic document type, provide, by the cloud storage system, the customized GUI of the first electronic document editing application, wherein the customized GUI uses an application programming interface (API) that is associated with the first electronic document editing application and this is configured to allow the second user to manipulate, via the customized GUI, the electronic document of the first electronic document type.

13. The system of claim 12, wherein the customized GUI is embedded into the GUI of the third party platform via an inline frame (iframe) added to the GUI of the third party platform.

14. The system of claim 12, the processing device further to:
create, based on the customized GUI, a script to generate a preloaded version of the customized GUI to preload for presentation to the second user to allow the second user to manipulate the electronic document without a delay resulting from obtaining the customized GUI from the cloud storage system; and
transmit the script to the third party platform.

15. The system of claim 14, wherein
the request of the second user to manipulate the electronic document of the first electronic document type is a request to create a new electronic document of the first electronic document type; and
the script is to generate, in response to the request to create the new electronic document, the preloaded version of the customized GUI in local memory associated with a browser that presents the GUI of the third party platform, the preloaded version of the customized GUI is to display a blank electronic document when the preloaded version of the customized GUI is rendered as part of the GUI of the third party platform.

16. The system of claim 15, wherein in response to user interaction with the preloaded version of the customized GUI, the script is to cause the customized GUI to be obtained from the cloud storage system to replace the preloaded version of the customized GUI presented as part of the GUI of the third party platform.

17. The system of claim 12, wherein:
the request of the second user to manipulate the electronic document of the first electronic document type is a request to edit an electronic document stored at the third party platform; and
to provide the customized GUI of the first electronic document editing application, the processing device to:
create, at the cloud storage system, a blank electronic document of the first electronic document type;
send, to the third party platform, a request for content of the electronic document stored at the third party platform;
receive the requested content of the electronic document;
modify the blank electronic document by pasting the content into the blank electronic document of the first electronic document type; and
provide the modified electronic document for presentation to the second user in the customized GUI of the first electronic document editing application.

18. A non-transitory computer-readable medium comprising instructions to customize graphical user interfaces (GUIs) of a plurality of electronic document editing applications provided by a cloud storage system for users of a third party platform, when the instructions responsive to execution by a processing device, cause the processing device to:
receive, by the cloud storage system, a request of a first user of the third party platform to customize a GUI of a first electronic document editing application of the plurality of electronic document editing applications provided by the cloud storage system, each of the plurality of electronic document editing applications configured to manipulate electronic documents of a particular one of a plurality of different electronic document types;
provide, by the cloud storage system, the requested GUI of the first electronic document editing application for presentation at a client device associated with the first user, the first electronic document editing application associated with a first electronic document type;
receive input of the first user for one or more of a plurality of GUI components of the requested GUI presented at the client device, the plurality of GUI components associated with features of the first electronic document editing application;
customize the GUI of the first electronic document editing application based on the received input of the first user;
store, at the cloud storage system, the customized GUI of the first electronic document editing application in association with an identifier of the third party platform, the customized GUI to be embedded into a GUI of the third party platform, wherein the third party platform hosts one or more services that are accessible via the GUI of the third party platform;
receive, via the GUI of the third party platform, an indication of a request of a second user of the third party platform to manipulate an electronic document of the first electronic document type; and
upon receiving the indication of the request of the second user to manipulate the electronic document of the first electronic document type, provide, by the cloud storage system, the customized GUI of the first electronic document editing application, wherein the customized GUI uses an application programming interface (API) that is associated with the first electronic document editing application and that is configured to allow the second user to manipulate, via the customized GUI, the electronic document of the first electronic document type.

19. The non-transitory computer-readable medium of claim 18, wherein the customized GUI is embedded into the GUI of the third party platform via an inline frame (iframe) added to the GUI of the third party platform.

20. The non-transitory computer-readable medium of claim 18, the processing device further to:
create, based on the customized GUI, a script to generate a preloaded version of the customized GUI to preload for presentation to the second user to allow the second user to manipulate the electronic document without a delay resulting from obtaining the customized GUI from the cloud storage system; and
transmit the script to the third party platform.

21. The non-transitory computer-readable medium of claim 20, wherein
the request of the second user to manipulate the electronic document of the first electronic document type is a request to create a new electronic document of the first electronic document type; and
the script is to generate, in response to the request to create the new electronic document, the preloaded version of the customized GUI in local memory associated with a browser that presents the GUI of the third party platform, the preloaded version of the customized GUI is to display a blank electronic document when the preloaded version of the customized GUI is rendered as part of the GUI of the third party platform.

22. The non-transitory computer-readable medium of claim 21, wherein in response to user interaction with the preloaded version of the customized GUI, the script is to cause the customized GUI to be obtained from the cloud storage system to replace the preloaded version of the customized GUI presented as part of the GUI of the third party platform.

23. The non-transitory computer-readable medium of claim 18, wherein:
the request of the second user to manipulate the electronic document of the first electronic document type is a request to edit an electronic document stored at the third party platform; and
to provide the customized GUI of the first electronic document editing application, the processing device to:
create, at the cloud storage system, a blank electronic document of the first electronic document type;
send, to the third party platform, a request for content of the electronic document stored at the third party platform;
receive the content of the electronic document;
modify the blank electronic document by pasting the content into the blank electronic document of the first electronic document type; and
provide the modified electronic document for presentation to the second user in the customized GUI of the first electronic document editing application.

\* \* \* \* \*